W. A. TURBAYNE.
REGULATOR FOR ELECTRIC GENERATORS.
APPLICATION FILED APR. 20, 1914.
1,251,707.
Patented Jan. 1, 1918.
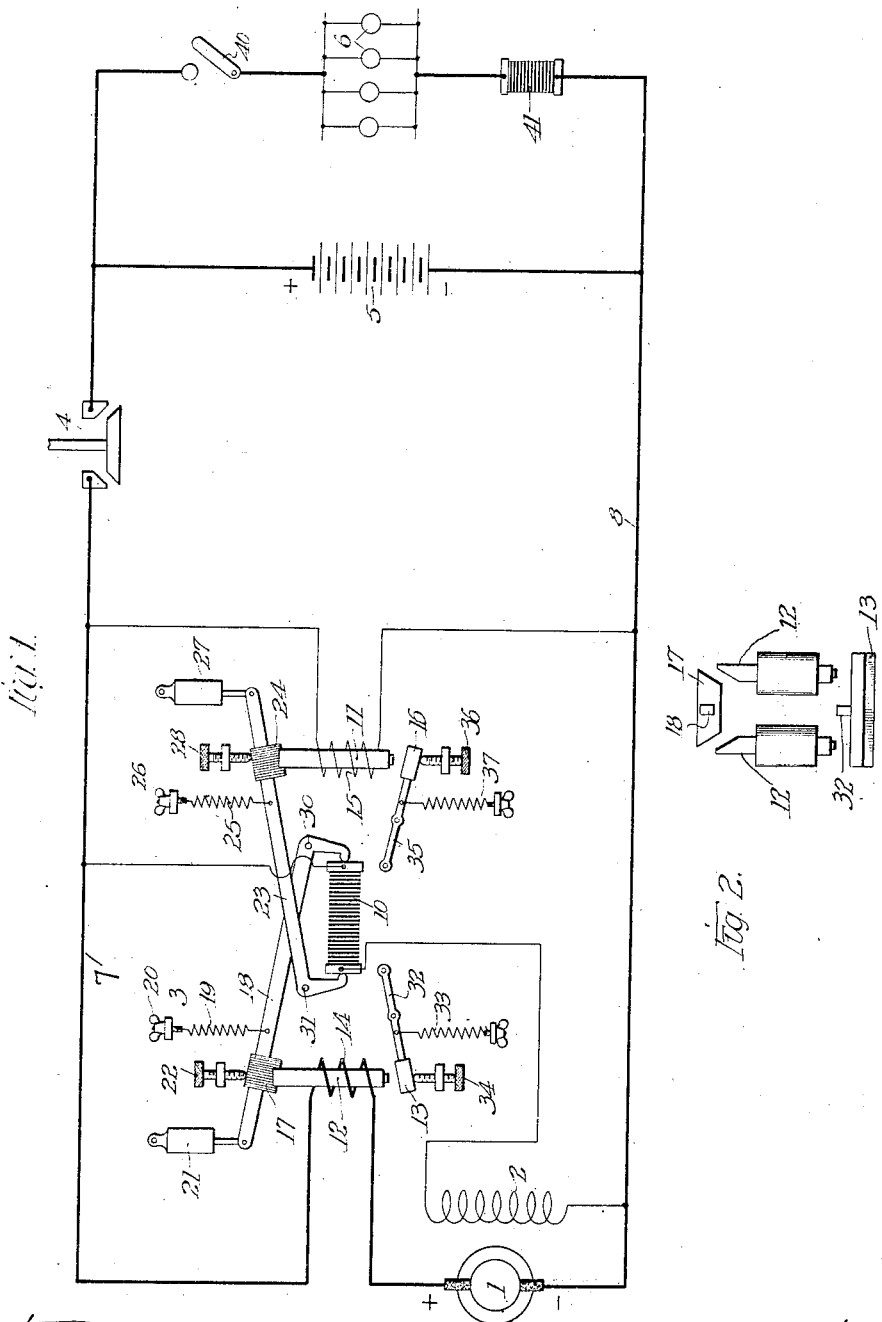

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATOR FOR ELECTRIC GENERATORS.

1,251,707.                    Specification of Letters Patent.          Patented Jan. 1, 1918.

Application filed April 20, 1914.   Serial No. 833,285.

*To all whom it may concern:*

Be it known that I, WILLIAM A. TURBAYNE, a citizen of the United States, residing at Niagara Falls, in the county of Niagara and State of New York, have invented new and useful Improvements in Regulators for Electric Generators, of which the following is a full, clear, concise, and exact description, reference being had to the accompanying drawing, forming a part of this specification.

This invention relates to regulators for electric generators.

The invention is especially applicable to variable speed battery charging generators such as are employed in railway car lighting and automobile starting and lighting systems, although the invention is not limited to such use and may be employed under other conditions and in other relations.

Regulating systems have been proposed in which a single resistance is provided for controlling the field circuit of the generator and two electromagnetic windings are arranged to control the resistance, one of these windings being current-controlled, that is, the current through it being proportional to the generator current, and the other winding being voltage-controlled, that is, the current through it being in proportion to the voltage across the generator terminals.

In such systems, if the controlling windings are rendered very sensitive so that they respond to small values in current therethrough, they have the disadvantage of beginning to increase the field resistance before full value of current or voltage is attained. This causes interference with the quick building up of the voltage or current of the machine and introduces an undesirable characteristic. If, on the other hand, the magnets are rendered comparatively insensitive or unresponsive to small increments of current, the generator voltage will be built up quickly, but the regulation will be rendered uncertain, and at highest generator speeds, excessive current or voltage may be permitted. The present invention provides means for avoiding both evils, but secures the advantages residing in each type of regulator.

An object of the present invention is to provide an improved generator regulator which will hold the generator field resistance at a minimum until the generator output reaches the full predetermined value which it is desired to hold constant.

Another object of the invention is to provide an improved regulator which will allow a maximum charging current at low speeds of the generator.

Another object of the invention is to provide an improved regulator which is inactive until regulation of either current or voltage of the generator is needed.

One embodiment of the improved regulator is illustrated in the accompanying drawings, in which—

Figure 1 is a diagram of a system including the improved regulator.

Fig. 2 is a fragmentary detail illustrating one of the controlling electromagnets.

The regulating magnets are constructed to be unresponsive to effect regulation until a prompting or sensitizing means is brought into action to affect them. This prompting or sensitizing means is brought into action under predetermined conditions of current flowing through the magnet windings corresponding to a definite value of current or a definite value of voltage, as may be preferred. This sensitizing means is withdrawn from action when the current through the magnet windings, which may be proportional to the current or voltage as desired, falls below a certain value. In this manner, the magnets are rendered unresponsive to effect regulation until certain definite current or voltage values are attained. Beyond such definite values they are highly responsive to minute variations in current or voltage.

The main elements of the system shown in Fig. 1 comprise a variable speed generator having an armature 1 and a shunt winding 2, a regulator 3, automatic switch 4, storage battery 5 and a lamp load 6. These elements are interconnected by the mains 7 and 8.

The regulator 3 comprises a variable resistance 10 which may be a carbon pile or any preferred form of variable resistance in series with the shunt winding 2 of the generator. The pressure on the carbon pile rheostat 10 may be varied by either or both of the two electromagnets 11 and 12 operating through bell crank levers 23 and 18 respectively. No stationary abutments for the ends of the carbon pile resistance 10 are furnished, the ends of the bell crank levers 18 and 23 serving this purpose. The two electromagnets 11 and 12 are similar in construction except that the magnet 11 has a shunt winding 15 and the magnet 12 has a series winding 14. As shown in Fig. 2, the magnetic circuit of the electromagnet comprises two parallel cores 12 and two armatures 13 and 17. There is a very large reluctance in this circuit, so large in fact that the magnetizing effect of the winding 14 is ineffective to overcome the pull of the spring 19 until the reluctance is reduced. This is accomplished by means of the armature 13 which is mounted on a statically balanced lever 32 and held away from the cores 12 by means of a spring 33, the tension of which may be adjusted. The air gap between the cores and the armature 13 may be adjusted by a screw 34, or other adjusting means. Upon the attainment of a definite current value in the winding 14, the armature 13 is attracted, thereby decreasing the reluctance of the magnetic circuit and enabling the magnet to overcome the tension of the spring 19 and control the pressure on the rheostat 10. The movement of the armature and bell crank lever is steadied by a dash-pot 21 attached to the end of the bell crank lever.

In the position of rest or ineffective low speeds of the generator armature, the various parts are in the position shown in Fig. 1. A maximum pressure is exerted on the rheostat 10, whereby its resistance is a minimum. The pressure upon this rheostat may be adjusted by adjusting the tension of springs 19 and 25 and by adjusting the distance through which the bell crank levers 18 and 23 may operate by means of the abutments 22 and 28, shown in this instance as thumb screws. As the generator begins to operate, its field will rapidly build up, due to the fact that the compressible rheostat 10 is held fully compressed by the action of the springs 19 and 25, as both controlling magnets are incapable of exerting any regulating effect as long as their armatures 13 or 16 are unattracted. Under these conditions, the generator will, at a very low speed, attain a voltage which is substantially equal to the battery voltage. When this voltage is reached, the automatic switch, which may be of any of the well known types, will close, and battery charging current will flow from the armature 1, through the series winding 14, lead 7, battery 5, and back to the generator through the lead 8. As soon as the generator current reaches the value for which the current regulator is set, the coil 14 will be sufficiently energized to attract the armature 13. Attraction of the armature 13 so reduces the magnetic reluctance of the controlling magnet 12, that its armature 17 is brought within the magnetic field of the magnet. Upon further increase in generator speed, the magnet 12 will attract the armature 17 against the action of the spring 19 and through the bell crank lever 18, will decrease pressure on the compressible rheostat 10, thereby inserting resistance in the field circuit to hold the generator current at the predetermined maximum value which it is desired to be held constant.

If the regulation of the generator were subject only to current control, the battery would necessarily be overcharged if the charging operation continued. As the charge of the battery nears completion, the counter-electromotive force of the battery rises and the tendency of more current to flow through the field winding 2 tends to raise the voltage of the generator and keep the maximum value of current flowing. The armature 16 of the electromagnet 11, which is voltage-controlled, is so adjusted that when the voltage across the mains rises to a predetermined point which is the maximum desired to be impressed on the battery, the armature 16 will be attracted to the cores 11. The reluctance in the magnetic circuit of this magnet is thereby reduced and the armature 24 is subject to the control of the magnet. Any tendency toward increase of voltage across the mains 7 and 8 operates to relax further the pressure on the rheostat 10 and to cut down the excitation of the generator, to thereby hold the voltage constant. The charging current drops off rapidly under these conditions and a value is soon reached at which the attraction of the coil 14 is insufficient to retain the armature 13 against the cores 12. When this value is reached, the spring 33 withdraws the armature 13, thereby increasing the reluctance of the magnetic circuit of the magnet and rendering the armature 17 unresponsive to control by the magnet. The control of the rheostat thus passes over completely to the voltage controlled magnet 11, the armature of which may be so adjusted as to produce a stop charge and hold the voltage across the mains 7 and 8 at such a value as to float the battery across the line while supplying any current which may be drawn by the lamps 6, or other translating devices.

The adjustment of the armature may be such that a small current will continue to flow through the battery 5, giving what is known as a "taper charge" effect. If the generator is stopped, or the speed of the armature 1 decreases to such a point that the voltage across the mains is insufficient to retain the armature 16 against the cores 11, the armature 16 will drop back into the position shown in Fig. 1. When the armature again begins to rotate, the cycle of operations will be repeated. The structure above described provides a current control which does not interfere with building up of the voltage in the machine, as it is operated only after the automatic switch is closed, and a voltage-controlled regulating means which becomes operative only when the battery reaches a predetermined voltage and which thereafter assumes sole control, rendering the current-controlled means inoperative.

The structure shown in Fig. 2 illustrates the magnet cores 12 with tapered ends conforming to the armature 17, which is wedge-shaped. This allows a considerable movement of the armature 17 without striking the pole pieces.

The lamps 6, shown in Fig. 1, may be bridged across the battery circuit by closing the switch 40, and the voltage across the lamps may be controlled by a lamp rheostat 41.

This invention is applicable not only to a storage battery system, but to a system where any kind of a counter-electromotive force device is useful in the place of said battery, as well as in other relations.

While the invention has been described and illustrated with reference to a particular embodiment, the invention may be practised by other means and may be employed in other relations and under other conditions, and it is not desired to limit the invention to the details of the embodiment described, except as such limitations may be imposed by the appended claims.

What I claim as new and desire to secure by Letters Patent of the United States is:—

1. In a regulator for a shunt-wound generator, a variable resistance, a series-wound controlling magnet therefor, a shunt-wound controlling magnet therefor, armatures for said magnets, each armature controlling said variable resistance but normally unresponsive to variations of current flow through its associated electromagnet, and means for rendering each armature responsive to current variations through its associated electromagnet.

2. A regulator for a shunt-wound generator comprising a variable resistance, two regulating magnets for controlling said resistance, said magnets being normally incapable of controlling said resistance, and means for each magnet to render the same capable of controlling the resistance.

3. A regulator for a generator comprising a resistance in series with the exciting winding of said generator, a current-controlled regulating magnet and a voltage-controlled regulating magnet, each of said magnets having means for controlling the variable resistance but normally unaffected by variations of current through said magnet windings, and means to render said means sensitive to control by said magnets.

4. A regulator for a shunt-wound generator comprising a resistance in series with said shunt winding, a current-controlled regulating magnet and a voltage-controlled regulating magnet, armatures for each of said magnets operable to regulate said resistance, said magnets being normally incapable of operating said armatures, and means for each of said controlling magnets to render the same capable of operating its associated armature.

5. In a system of the class described having a variable speed shunt-wound generator, a regulator, an automatic switch and a storage battery, said regulator including a variable resistance in series with the shunt winding of said generator, a current-controlled regulating magnet therefor and a voltage-controlled regulating magnet therefor, said magnets being incapable of controlling said variable resistance, means controlled by a current of predetermined value to cause said current-controlling magnet to become capable of controlling said resistance, and means thereafter operating to render the voltage-controlled regulating magnet capable of controlling said variable resistance and for rendering said current-controlled regulating magnet inoperative to control said resistance.

6. A regulator for a generator including a variable resistance controlling the excitation of said generator, current controlled means for regulating said resistance, voltage-controlled means for regulating said generator, both of said controlling means being normally inoperative, means for rendering said current-controlled means operative to control the resistance, and means thereafter operating to render the voltage-controlled means operative to control said resistance and to render said current-controlled means inoperative.

7. In a system of the class described having a variable speed generator, a regulator for said generator, said regulator including a single variable resistance, a controlling magnet having a winding in series with said generator, a controlling magnet having a winding in shunt to said generator, means operated by a current of predetermined value to render said series-wound controlling magnet operative to control the resistance, and means operated at a definite voltage by said shunt-wound magnet to render said shunt-wound magnet operative to control the resistance and to render said series-wound magnet inoperative.

8. A regulator for a generator including a variable resistance, a plurality of controlling electromagnets, each of said magnets having an armature for controlling said resistance, said armatures being unresponsive to variations in current flow through its electromagnet, and means to render each of said armatures responsive to variations in current flow in its corresponding electromagnet.

9. A regulator for a generator including a variable resistance subject to control by a plurality of electromagnets, each of said electromagnets having an armature included in a magnetic circuit of high reluctance, whereby said armature is unresponsive to variations in current flow through the winding of said magnet, and means actuated upon the attainment of a predetermined current value in said coil to reduce the reluctance of said magnetic circuit to render the armature responsive to variations in current flow.

10. Generator regulating means including a variable resistance, current-responsive means associated therewith normally inoperative to vary said resistance, means adapted to render said current-responsive means operative under predetermined conditions to vary said resistance, voltage-responsive means associated with said resistance and normally inoperative to vary said resistance, and means under the control of said voltage-responsive means for rendering said voltage-responsive means operative to vary said resistance under predetermined conditions.

11. Regulating means for a variable speed generator including a regulating medium and operating means therefor, said operating means having a current responsive coil and a voltage responsive coil, said operating means having spring means opposing the effects of said coils, and means for rendering each of said coils ineffective to control said regulating medium until the attainment of a predetermined current value in the respective coils.

In witness whereof, I have hereunto subscribed my name in the presence of two witnesses.

WILLIAM A. TURBAYNE.

Witnesses:
J. E. CANNON,
R. J. ELLIS.